United States Patent [19]
Loose

[11] 3,819,419
[45] June 25, 1974

[54] STEADY STATE THERMAL RADIOMETERS

[75] Inventor: Jack D. Loose, Huntsville, Ala.

[73] Assignee: The United States of America as represented by the Administrator of the National Aeronautics and Space Administration, Washington, D.C.

[22] Filed: Nov. 17, 1972

[21] Appl. No.: 307,728

[52] U.S. Cl.................. 136/213, 136/230, 136/233
[51] Int. Cl............................................. H01v 1/02
[58] Field of Search ........... 136/213, 216, 230, 233, 136/225; 73/355 R

[56] References Cited
UNITED STATES PATENTS

| 3,427,209 | 2/1969 | Hager | 136/225 |
| 3,431,149 | 3/1969 | Webb | 136/213 |
| 3,511,991 | 5/1970 | Beerman | 136/213 UX |
| 3,607,445 | 9/1971 | Hines | 136/225 |

OTHER PUBLICATIONS
Leighton et al., J. Phys. Chem., 36, 1822–1824 (1932)

Primary Examiner—Benjamin R. Padgett
Assistant Examiner—E. A. Miller
Attorney, Agent, or Firm—L. D. Wofford, Jr.; G. J. Porter; J. R. Manning

[57] ABSTRACT

A radiometer operative in a vacuum under steady-state conditions. The front element is an aluminum sheet painted on the outer side with black or other absorptive material of selected characteristics. A thermocouple is bonded to the inner side of the aluminum sheet. That is backed by highly insulative layers of glass fiber and crinkled, aluminized Mylar polyester. Those layers are backed with a sturdy, polyester sheet, and the entire lamination is laced together by nylon cords. The device is effective for the purposes designed, is highly reliable in that it does not drift out of calibration, and is significantly inexpensive.

12 Claims, 2 Drawing Figures

PATENTED JUN 25 1974 3,819,419
FIG.1.
FIG.2.
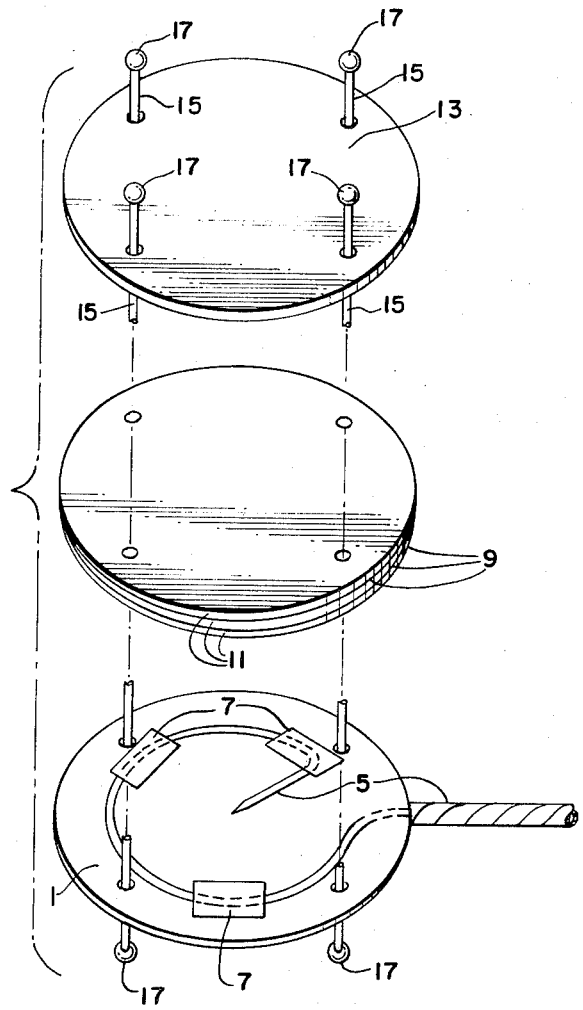
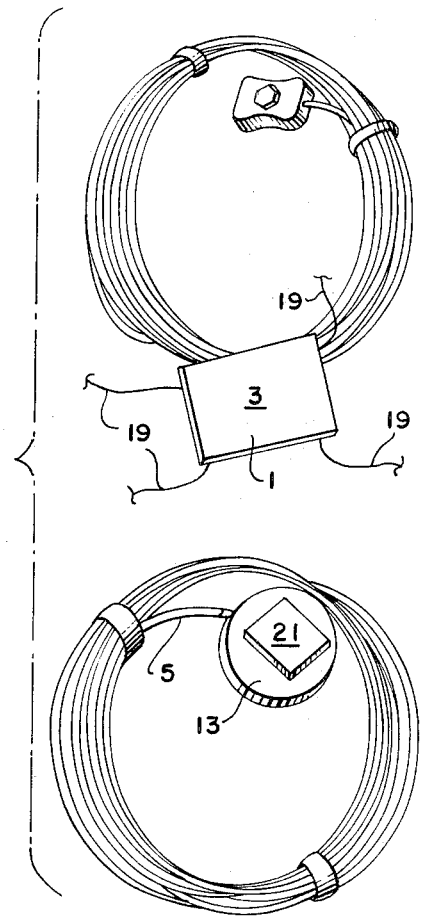

STEADY STATE THERMAL RADIOMETERS

ORIGIN OF THE INVENTION

The invention described herein was made by an employee of the United States Government and may be manufactured and used by or for the Government for governmental purposes without the payment of any royalties thereon or therfor.

BACKGROUND OF THE INVENTION

This invention relates to radiometers, and in particular to devices to observe and measure thermal radiation in a vacuum or other environment in which convection and heat transfer influences are not significant factors.

Many variations of thermal radiation flux sensors are commercially available. Those which measure only radiation effects are properly denominated radiometers. Other sensors respond to a range of heat transfer conditions, including conduction and convection, and are denominated calorimeters.

Radiometers are typically sophisticated and expensive, monitoring both steady state and transient fluxes and being capable of operation in a vacuum, an atmosphere, or both. Such sensors generally employ one of three principles. The "Gardon" type sensor works on the principle that the heat absorbed by an exposed circular disk is a function of the resulting radial temperature gradient across the disk. The "Schmidt-Voltaire" type sensor works on the principle that the heat absorbed by an exposed wafer is proportional to the temperature gradient through the wafer. The "capacitance" type gage works on the principle that the heat absorbed by an isolated slug is a function of the slug temperature and temperature-time derivative.

The prior art devices are limited by a number of disadvantageous characteristics, in particular the following:

1. Expensive—Commerical sensors are manufactured in small lots or to customer requirements and generally exceed $100.00 per unit in cost to the customer.

2. Fragile—Most sensors contain delicate internal mounting strands and fine wiring, requiring care in handling to avoid damage.

3. Require Temperature Correction—Many sensors require relatively inaccurate temperature correction factors or special temperature conditioning (such as water cooling of the sensor), making their use difficult, particularly in enclosed vacuum chambers.

4. Require Correction for Spectrum Filtering—Several sensors employ a window over the sensing element which filters part of the incident energy spectrum. Such systems require a precise knowledge of the incident spectrum and an approximate calculation after the measurement to determine the energy level received.

5. Limited Range—Few of the sensors are capable of accurately monitoring radiation fluxes in the low range (0 – ½ solar constant).

6. Require Recalibration—To maintain accuracy, the complex or delicate sensors require recalibration after extended use. Recalibration is usually performed at a fee by the manufacturer, as it usually entails the use of specialized and expensive calibration equipment.

7. Difficult to Fabricate—Commercially available sensors require specialized tooling, skills, and materials for fabrication, precluding fabrication by the relatively unskilled user.

8. High Weight & Bulky Mounting—Many of the commeriial sensors are relatively heavy, requiring bulky mounting fixtures which block part of the mounting surface from the incoming flux.

None of the known prior art employs an uncomplicated sensing assembly isolated by a pad of insulation in the manner of this invention. The radiometer in accordance with this invention is designed for use for steady-state applications in a vacuum.

SUMMARY OF THE INVENTION

It is a primary object of this invention to provide a radiometer which is inexpensive and practical.

It is, similarly, an object of this invention to provide a radiometer which is uncomplicated and may be fabricated without specialized equipment, facilities, or personnel.

It is another object of this invention to proivde a radiometer which is relatively sturdy and not notably subject to impact damage.

It is another object of this invention to provide a radiometer which is easily fabricated and may be built to custom requirements by the user.

It is another object of this invention to provide a radiometer which does not require periodic calibration.

It is, similarly, an object of this invention to provide a radiometer which does not require complicated matermatical manipulation or other such modification of the output data.

It is another object of this invention to provide a radiometer which is not subject to spectrum filtering.

It is, similarly, another object of this invention to provide a radiometer which has no inherent limitation in the frequency range observed.

It is also an object of this invention to provide a radiometer which is light in weight and easily mounted.

It is, similarly, an object of this invention to provide a radiometer which is small and minimizes blockage of any surface to which it is mounted.

It is another object of this invention to provide a radiometer which has an unimpaired (180°) field of view in one direction.

In accordance with this invention a radiation-responsive, temperature-measuring radiometer has a metal sheet painted on the outer side with an absorptive material of desired characteristics. A thermocouple is attached to the inner side. That assembly is backed by an insulating pad of high performance, made up of layers of glass fiber and aluminized polyester in the preferred embodiment. The far layer may be a heavy, polymer sheet, and the entire assembly is laced together by cords of heat insulation material, such as nylon.

BRIEF DESCRIPTION OF THE DRAWINGS

These and other objects, features, characteristics, and advantages of the invention will be apparent by consideration of the following description of preferred embodiments, as illustrated by the accompanying drawings.

FIG. 1 is a perspective view of a preferred device, round in external configuration, with the parts separated for better illustration.

FIG. 2 illustrates two of the devices completed, one round and one square, but otherwise essentially identical.

DESCRIPTION OF THE PREFERRED EMBODIMENTS

The preferred embodiment comprises one of circular form, 1 ¾ inch in diameter, and one of square form, 2 inches wide, which are otherwise essentially identical. FIG. 1 shows the circular embodiment, but is equally descriptive in other respects of the device when built square externally or of other external configurations. As will be evident, the outer configuration defines the area of ratiation intercepted and thereby observed by the radiometer.

A thin, aluminum alloy plate 1 serves as the sensing head. The outer side of the plate 1 is painted completely with a surface 3 (FIG. 2) of a material absorbent to selected spectral bands of heat radiation. Such materials are available conventionally and may be black if the entire spectrum is of interest, or may be of a nature absorbent to only the frequencies of interest.

On the inner side of plate 1, a conventional, copper-constantan, two-wire thermocouple 5 is attached. In the preferred embodiment it is attached to the surface with strips of adhesive tape 7. The leads from thermocouple 5 which extend from the body of the radiometer are wrapped with a metal shield to substantially eliminate inaccuracies which might be caused by radiation loss from those leads.

Plate 1 contains four, 0.025 inch diameter holes symetrically located near its outer edges.

Behind thermocouple 5 are alternate layers which make up a high-performance thermal insulation pad. The comprises alternate layers of paper-like fiber glass 9, followed by layers of crinkled (a rumpled condition) aluminum coated (aluminized) Mylar polyester 11. (The glass fiber laminations 9 in the preferred embodiments are of borosilicate glass fibers, nominally 14 pounds per cubic foot, with each lamination being 0.006 inch thick.) The laminations 9 and 11 have four holes punched through them matching and aligned with the holes in the plate 1.

At the inner side is a strong, polyester sheet 13, which provides rigidity to the assembly. In the preferred embodiment sheet 13 is Mylar polyester 0.014 inch thick. It is also has holes matching and aligned with those in plate 1 and the pad elements 9 and 11.

The plate 1 and its attachments, the insulation pad 9 and 11, and the backing sheet 13 are held in contact by low-thermal-conductivity nylon cords 15. A single cord is threaded through each of the aligned holes of the assembly and is heated at each end to form a bead 17 at each end which will not then pass through the holes.

The radiometer may be suspended in place for measurement by threads 19 (FIG. 2, square embodiment) attached to the backing sheet 13 or may be fastened to the test article surface. A conventional Velcro fastener 21 is shown on the back of the circular embodiment in FIG. 2 as illustrative of the use of such fasteners.

The devices can be fabricated inexpensively and without special facilites. The cost of materials may be quite small. Technicians without extensive training or exceptional skills have fabricated the devices in quanitites of more than four hundred at an average time expendature of 1.04 hours per device. This compares with an approximate purchase cost of $300.00 for each commerical sensor which would otherwise be used for the same measurement operation.

THEORY OF DESIGN AND SELECTION OF PARTS

In the absence of convective heat transfer (i.e., in a vacuum) the outer, steady-state flux absorbed by the absorbent surface equals the sum of re-radiation and conduction losses, which is stated by formula as follows:

$$Q_{abs} = \epsilon \sigma T^4 + Q_L$$

where:

$Q_{abs}$ = Absorbed heat flux (BTU/hr-ft$^2$)
$\epsilon$ + Emissivity of surface
$\sigma$ = Stefan-Boltzmann Constant (0.1714 × 10$^{-8}$ BTU/hr-ft$^2$)
T = Surface temperature (° R)
$Q_L$ = Conductive heat loss from surface Emissivity, $\epsilon$, is a known characterisitc, or measurable.

Temperature, T, is monitored directly by the thermocouple 5.

$Q_L$ occurs by conductivity through the attached parts, which in the device are the pad insulation 9 and 11, the leads of the thermocouple 5, and the nylon cords 15. The design in accordance with this invention makes $Q_L$ negligibly small.

Since $Q_L$ is negligible, $Q_{abs} = \epsilon \sigma T^4$.

When the absorbtive coating of the device (numeral 3 in FIG. 2) is of known absorptance, $\alpha$, the incident flux is directly established mathematically by the following: $Q_{abs} = \alpha Q_{inc}$ where:

$Q_{inc}$ = Incident flux

By straightforward substitution and manipulation:

$$Q_{inc} = \epsilon \sigma T^4 / \alpha$$

If incident flux is to be monitored, a spectrally insensitive coating, such as a flat black paint, is used. Where the radiant flux absorbed by a surface is to be measured, and the absorptance of the surface to the incoming radiation spectrum is unknown or not known to the desired degree of precision, the sensor is coated identically as the surface; flux absorbed by the surface is then monitored virtually directly without knowledge required of the surface absorptance.

IN OPERATION

Operation of the device is, of course, inherent in the design and takes place without human intervention or movement of parts. Voltage readings at the output leads of the thermocouple 5 may be directly transposed into values representing the heat intensity of incident radiation. The device itself need not be calibrated, and maintenance and other continuing supervision is largely unnecessary. The device is simple and rugged. It may be constructed at the site of use in desired form by relatively untrained personnel.

Since the device has so little tendency to change or "drift" in output values or to develop other inaccuracies, it is quite useful for calibration purposes. The radiometer may be employed to calibrate thermal radiation simulators, and, of course, used for general monitoring of environments under test for steady-state heat radiation.

The radiometers may be suspended by threads 19 attached to the back sheet 13, or the radiometers may be attached to an object by a fastener 21 attached to the back 13.

The very low cost of fabrication and use of the devices is exploited by the use of greately increased numbers of the sensors over a given external surface area to be observed or tested. The reliability of the devices is exploited by using them as redundant measuring elements with more sophisticated sensors, to thereby indicate inaccurate operation of the more sophisticated devices. The value of the radiometer in accordance with this invention has been established by various actual performances including the successful use of as many as three hundred eighty-nine of the sensors to map steady-state geometric distribution of flux during flux simulator calibration, and the use of the sensors as backup for commercial sensors in test operations.

The radiometer is suited to be built to the requirements of particular applications. Refinements of the invention and other variations will be apparent, and variations may well be developed which employ more than ordinary skill in this art, but nevertheless employ the basic contribution and elements of this invention. Accordingly, patent protection should not be essentially limited by the preferred embodiments disclosed, but should be as provided by law, with particular reference to the accompanying claims.

What is claimed is:

1. A radiometer comprising a heat conductive element having heat absorptive characteristics on one side, a thermocouple in contact with the side of said element obverse to said one side, and a pad having high heat insulating characteristics positioned on said obverse side covering said thermocouple.

2. The radiometer as in claim 1 in which said element is a metal plate having a layer of absorptive paint on said one side.

3. The radiometer as in claim 1 in which said pad comprises alternate layers of a fiber material and an aluminum coated polymer.

4. The radiometer as in claim 3 in which said element is a metal plate having a layer of absorptive paint on said one side.

5. The radiometer as in claim 4 in which said plate and said alternate layer are held in contact by cords of heat insulative material which pass through aligned holes through said plate and said alternate layers.

6. The radiometer as in claim 5 in which the material of said cord is nylon.

7. The radiometer as in claim 5 also comprising a layer of a strong polymer positioned in contact with the side of said alternate layers opposite said plate and held in contact by said cord which passes through holes in said strong polymer aligned with holes in said plate and said alternate layers.

8. The radiometer as in claim 7 also having means to support said radiometer attached to said layer of strong polymer.

9. The radiometer as in claim 7 in which said plate is an aluminum alloy sheet, said fiber material is fiber glass, and said aluminum coated polymer is crinkled aluminum coated polyester.

10. The radiometer as in claim 9 in which said fiber glass is borosilicate glass and the material of said cord is nylon.

11. The radiometer as in claim 10 in which said strong polymer is a polyester and means to support said radiometer are attached to said layer of strong polymer.

12. The radiometer as in claim 11 in which ends of said nylon cords have been melted into beads which will not pass through the aligned holes, thereby holding the radiometer elements together.

* * * * *